United States Patent
Glisson et al.

(10) Patent No.: US 7,704,145 B2
(45) Date of Patent: Apr. 27, 2010

(54) METHOD AND APPARATUS FOR USE OF A NETWORK BY A CASINO

(75) Inventors: Floyd W. Glisson, Henderson, NV (US); Vincent S. Manfredi, Henderson, NV (US); R. Jeffrey Jordan, Henderson, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 11/479,031

(22) Filed: Jun. 29, 2006

(65) Prior Publication Data
US 2007/0015587 A1    Jan. 18, 2007

Related U.S. Application Data

(62) Division of application No. 10/349,874, filed on Jan. 22, 2003, now abandoned.

(51) Int. Cl.
*G06Q 40/00* (2006.01)

(52) U.S. Cl. .............. 463/25; 463/16; 463/42; 273/138.1; 705/19; 705/31; 902/23

(58) Field of Classification Search ......... 463/16–23, 463/25–27, 29, 30–33, 40–43, 47; 273/138.1, 273/139, 138.2, 141 A, 454–456, 460; 705/14, 705/26, 42, 77, 19, 31, 36 T, 70; 902/10, 902/23; 709/203–207; 713/1, 100, 150, 713/182, 187–189, 300, 375, 400, 500, 600; *G06Q 40/00*
See application file for complete search history.

(56) References Cited

U.S. PATENT DOCUMENTS

| | | | |
|---|---|---|---|
| 4,283,709 A | 8/1981 | Lucero et al. | |
| 4,531,187 A | 7/1985 | Uhland | |
| 4,669,730 A | 6/1987 | Small | |
| 4,815,741 A | 3/1989 | Small | |
| 4,842,278 A | 6/1989 | Markowicz | |
| 4,882,473 A | 11/1989 | Bergeron et al. | |
| 5,265,874 A | 11/1993 | Dickinson et al. | |
| 5,276,312 A | 1/1994 | McCarthy | |

(Continued)

FOREIGN PATENT DOCUMENTS

AU         2003200809        9/2003

(Continued)

OTHER PUBLICATIONS

Department of Treasury, Form W-2G, 2000, Internal Revenue Service, pp. 1 and 5.*

(Continued)

*Primary Examiner*—Peter DungBa Vo
*Assistant Examiner*—Arthur O. Hall
(74) *Attorney, Agent, or Firm*—Weaver Austin Villeneuve & Sampson LLP

(57) ABSTRACT

A casino receives activity from a player, both in-house and on-line. The player's activities are combined in a single account stored by the casino. The combined activities can then be used to the player's benefit, for example by awarding benefits to the player, allowing the player to access his activity across a network, or by preparing for the player a tax statement based on his year-to-date activities.

9 Claims, 16 Drawing Sheets

U.S. PATENT DOCUMENTS

| | | | |
|---|---|---|---|
| 5,326,104 A | 7/1994 | Pease et al. | |
| 5,429,361 A | 7/1995 | Raven et al. | |
| 5,505,461 A | 4/1996 | Bell et al. | |
| 5,586,937 A | 12/1996 | Menashe | |
| 5,618,232 A * | 4/1997 | Martin | 463/25 |
| 5,655,961 A | 8/1997 | Acres | |
| 5,672,106 A | 9/1997 | Orford et al. | |
| 5,674,128 A | 10/1997 | Holch et al. | |
| 5,761,647 A * | 6/1998 | Boushy | 705/10 |
| 5,766,075 A | 6/1998 | Cook et al. | |
| 5,796,393 A | 8/1998 | MacNaughton et al. | |
| 5,875,433 A * | 2/1999 | Francisco et al. | 705/26 |
| 5,884,271 A | 3/1999 | Pitroda | |
| 5,903,881 A | 5/1999 | Schrader et al. | |
| 5,917,725 A | 6/1999 | Thacher et al. | |
| 5,919,091 A | 7/1999 | Bell et al. | |
| 6,001,016 A | 12/1999 | Walker et al. | |
| 6,003,013 A | 12/1999 | Boushy et al. | |
| 6,016,479 A | 1/2000 | Taricani, Jr. | |
| 6,030,288 A * | 2/2000 | Davis et al. | 463/29 |
| 6,033,308 A | 3/2000 | Orford et al. | |
| 6,048,269 A | 4/2000 | Burns et al. | |
| 6,113,495 A * | 9/2000 | Walker et al. | 463/42 |
| 6,183,362 B1 | 2/2001 | Boushy | |
| 6,202,052 B1 * | 3/2001 | Miller | 705/31 |
| 6,234,900 B1 | 5/2001 | Cumbers | |
| 6,236,980 B1 | 5/2001 | Reese | |
| 6,244,957 B1 | 6/2001 | Walker et al. | |
| 6,254,483 B1 | 7/2001 | Acres | |
| 6,280,328 B1 * | 8/2001 | Holch et al. | 463/42 |
| 6,302,793 B1 * | 10/2001 | Fertitta et al. | 463/25 |
| 6,312,333 B1 | 11/2001 | Acres | |
| 6,319,125 B1 | 11/2001 | Acres | |
| 6,361,437 B1 | 3/2002 | Walker et al. | |
| 6,409,602 B1 | 6/2002 | Wiltshire et al. | |
| 6,425,828 B2 | 7/2002 | Walker et al. | |
| 6,511,377 B1 * | 1/2003 | Weiss | 463/25 |
| 6,607,441 B1 | 8/2003 | Acres | |
| 6,682,421 B1 | 1/2004 | Rowe et al. | |
| 6,712,698 B2 | 3/2004 | Paulsen et al. | |
| 6,722,985 B2 | 4/2004 | Criss-Puszkiewicz et al. | |
| 6,896,618 B2 * | 5/2005 | Benoy et al. | 463/25 |
| 6,935,952 B2 * | 8/2005 | Walker et al. | 463/25 |
| 6,969,320 B2 * | 11/2005 | Lind et al. | 463/25 |
| 6,993,502 B1 * | 1/2006 | Gryglewicz et al. | 705/31 |
| 7,128,652 B1 * | 10/2006 | Lavoie et al. | 463/42 |
| 7,165,044 B1 * | 1/2007 | Chaffee | 705/37 |
| 7,234,103 B1 * | 6/2007 | Regan | 715/234 |
| 7,379,908 B2 * | 5/2008 | Clancey et al. | 705/35 |
| 7,395,230 B2 * | 7/2008 | Hermreck et al. | 705/31 |
| 7,603,301 B1 * | 10/2009 | Regan | 705/31 |
| 2001/0031663 A1 | 10/2001 | Johnson | |
| 2002/0002075 A1 * | 1/2002 | Rowe | 463/25 |
| 2002/0039921 A1 * | 4/2002 | Rowe et al. | 463/25 |
| 2002/0082076 A1 * | 6/2002 | Roser et al. | 463/25 |
| 2002/0082085 A1 | 6/2002 | Osterer | |
| 2002/0111815 A1 | 8/2002 | Smith | |
| 2002/0116615 A1 | 8/2002 | Nguyen et al. | |
| 2002/0133410 A1 * | 9/2002 | Hermreck et al. | 705/19 |
| 2002/0142846 A1 | 10/2002 | Paulsen | |
| 2002/0147047 A1 * | 10/2002 | Letovsky et al. | 463/42 |
| 2002/0151359 A1 * | 10/2002 | Rowe | 463/29 |
| 2002/0187834 A1 * | 12/2002 | Rowe et al. | 463/42 |
| 2003/0061131 A1 * | 3/2003 | Parkan, Jr. | 705/30 |
| 2003/0083126 A1 * | 5/2003 | Paulsen | 463/25 |
| 2003/0162591 A1 | 8/2003 | Nguyen et al. | |
| 2003/0171149 A1 * | 9/2003 | Rothschild | 463/42 |
| 2003/0228901 A1 * | 12/2003 | Walker et al. | 463/25 |
| 2004/0078271 A1 * | 4/2004 | Morano et al. | 705/19 |
| 2004/0078307 A1 * | 4/2004 | Carver | 705/31 |

FOREIGN PATENT DOCUMENTS

| | | |
|---|---|---|
| EP | 1343125 | 9/2003 |
| GB | 2 193 441 | 2/1988 |
| GB | 2205188 | 11/1988 |
| WO | WO 95/30944 | 11/1995 |
| WO | WO 96/12262 | 4/1996 |
| WO | WO 00/03775 | 1/2000 |
| WO | WO 01/16864 | 3/2001 |
| WO | WO 01/16888 | 3/2001 |
| WO | WO 02/25560 | 3/2002 |
| WO | WO 02/30534 | 4/2002 |

OTHER PUBLICATIONS

Thomas, Weber. "E-World: Play-for-Fun Casinos Give Web Gambling a Solid Head Start", Asian Wall Street Journal, New York, N.Y: Jun. 12, 2001, p. 9.*

Matt Richtel, "For Internet Wagers, Shifting Legal and Financial Ground", New York Times, New York, N.Y.: Mar. 29, 2001, p. G.4.*

Robyn Taylor Parets, "Targeting the field", International Gaming & Wagering Business (IGWB), Divided on Detroit, vol. 18, No. 9, Sep. 1997.*

Jane Folpe. "Lick-and-stick on the Web." Fortune, New York: Mar. 20, 2000. vol. 141, Iss. 6, p. 28.*

Thomas, Weber, E-World: Play-for-fun Casinos Give Web Gambling a Solid Head Start:, Asian Wall Street Journal, New York, NY: Jun. 12, 2001, p. 9.

Matt Richtel, "For Internet Wagers, Shifting Legal and Financial Ground", New York Times, New York, NY: Mar. 29, 2001, p. G.4.

Robyn Taylor Parets, "Targeting the field", International Gaming & Wagering Business (IGWB), *Divided on Detroit*, vol. 18, No. 9, Sep. 1997.

International Gaming & Wagering Business (IGWB), *Man of the World*, vol. 17, No. 9, Sep. 1996, 2 pgs.

http://www.harrahs.com/TotalRewards/TotalRewards, as early as Oct. 2000, 10 pgs.

Olap Council White Paper, www.olapcouncil.org/research, Dec. 19, 2000, 4 pgs.

Jane Folpe, "Lick-and-stick on the Web", Fortune, New York, Mar. 20, 2000, vol. 141, Iss. 6, p. 28.

U.S. Office Action, dated Jun. 15, 2005 from U.S. Appl. No. 10/349,874.

U.S. Office Action, dated Jul. 2, 2004 from U.S. Appl. No. 10/349,874.

Australian Examination Report dated Mar. 9, 2009 from AU Application No. 2003252769.

* cited by examiner

| | Current Trip | Avg. Day | MTD | YTD | |
|---|---|---|---|---|---|
| Trip Number | 3 | | | | 07/24/ |
| Begin Date | 8/13/2002 | 07/24/2002-08/13/2002 7/24/2002 | Aug. 2002 8/5/2002 | 2002 7/24/2002 | 08/13 7/24 |
| Days Played | 1 | 0 | 3 | 4 | |
| Promotion | Yes | | | | |
| Slot Statistics | | | | | |
| Coin In | 0 | 48 | 63 | 478 | |
| Coin Out | 0 | 23 | 104 | 233 | |
| Jackpots | 0 | 0 | 0 | 0 | |
| Act. Win | 0 | 25 | -41 | 245 | |
| Theo. Win | | 2 | 3 | 23 | |
| Extra Credit Used | 0 | 6 | 63 | 63 | |
| Table | | | | | |

| Trip | Begin | End | Rooms | Promo | Status |
|---|---|---|---|---|---|
| | 12/23/2002 | 01/02/2003 | 1 | Yes | Pending |
| 3 | 08/13/2002 | 08/17/2002 | 1 | No | Current |
| | 08/13/2002 | 08/14/2002 | 1 | No | Pending |
| | 08/09/2002 | 08/10/2002 | 1 | No | No Show |
| 2 | 08/05/2002 | 08/08/2002 | 0 | No | Complete |
| 1 | 07/24/2002 | 07/26/2002 | 1 | No | Complete |

635

| Promotion | Status | Begin | End |
|---|---|---|---|
| Weekend of July 26-28 2002 | In-House | 07/26/2002 | 07/28/2002 |
| Last Blast of Summer | Associated | 08/01/2002 | 08/03/2002 |
| Celebration of summer's end | | | |
| August 8th Promo | Associated | 08/08/2002 | 08/08/2002 |
| August 8th Promo | | | |
| August 9-11 | Associated | 08/09/2002 | 08/11/2002 |
| August 9-11 Promo | | | |
| Summer's End | Associated | 08/09/2002 | 08/09/2002 |

Arrive On: Sept. ▶ 02 ▶ 2002 ▶
Depart On: Sept. ▶ 05 ▶ 2002 ▶
Guests: 1 ▶
Search — 815

☐ Room Type: Penthouse Suite — $1500.00/night
☐ Room Type: Deluxe Suite — $750.00/night
☐ Room Type: Deluxe King Room — $250.00/night  COMP!
☐ Room Type: Deluxe Queen Room — $?00.00/night

FIG. 8

METHOD AND APPARATUS FOR USE OF A NETWORK BY A CASINO

RELATED APPLICATION DATA

This application is a divisional of U.S. patent application Ser. No. 10/349,874, filed Jan. 22, 2003, now abandoned which is incorporated herein by reference. This invention further incorporates by reference, U.S. patent application Ser. No. 08/843,411, filed Apr. 15, 1997, now U.S. Pat. No. 6,319, 125, issued Nov. 20, 2001; U.S. patent application Ser. No. 08/322,172, filed Oct. 12, 1994, now U.S. Pat. No. 5,655,961, issued Aug. 12, 1997; U.S. patent application Ser. No. 09/134, 285 filed Aug. 14, 1998, now U.S. Pat. No. 6,607,441, issued Aug. 19, 2003; and U.S. patent application Ser. No. 09/694, 065, filed Nov. 19, 2000, now pending.

FIELD OF THE INVENTION

This invention pertains to gaming, and more particularly to the use of external networks by players.

BACKGROUND OF THE INVENTION

Not so long ago, casinos were places you visited to gamble. Las Vegas, Nev. began with an image of dark, smoke-filled rooms where people went to engage in sinful activities. The moniker "Sin City," while no longer used with vehemence, still sticks to Las Vegas, Nev.

Over time, casinos have shed their old images. Now, casino floors are brightly lit, welcoming places. The hotels have taken into account the need to entertain families and not just adult gamblers. Ventilation systems help reduce the smell of smoke, once a prominent feature of the casinos.

To keep current in the competitive market, casinos have been using player clubs to entice players into being "loyal" to a casino. When playing, the players use a card to identify themselves. This lets the casinos know how much money the player is spending at the casino. In return, the casinos provide bonuses to the players.

The advent of the Internet presents new opportunities for casinos to develop. Internet gaming, that is, the capability to gamble using the Internet, allows casinos to reach players who are not physically present on the casino floor. Players who, for one reason or another, cannot physically travel to the casino are still able to participate. But the use of the Internet is one-way: revenue flows in to the casino from the Internet, but nothing flows back to the player.

Some on-line casinos (that is, casinos that exist only in cyberspace) offer player clubs similar to those offered by casinos that players can visit. These on-line casinos can track their players' activities.

Some regular casinos have begun to allow players to access information about their accounts. For example, some casinos upload information about play to their player tracking databases at pre-selected times. This allows the casinos (and the players) to track information about in-house gaming, even when the users of the database are remote from the casino. But because the uploads occur at pre-selected times (e.g., once a day), the player cannot access current information about his gaming activities immediately. For example, the player might go onto the casino floor and participate in gaming activities, then return to his room and try to access his account. Because the information is only uploaded infrequently, the player will not be able to access the most current information about his account.

A need remains for a way to allow casinos to utilize networks that addresses these and other problems associated with the prior art.

SUMMARY OF THE INVENTION

The invention is a method and apparatus for using a network to benefit a player. In-house and on-line gaming activity is combined in a single account for the player. The combined activity can then be used to benefit the player. For example, benefits can include (but are not limited to) giving the player promotions, bonuses, coupons, or comps. These can be sent to the user via e-mail, direct mail, or any other means, and can be spontaneous on the part of the casino or responsive to a request from the player. The player can redeem the benefit by bringing in a copy to the casino, or by identifying himself to an attendant, who can verify electronically that the player is to receive the benefit.

The foregoing and other features, objects, and advantages of the invention will become more readily apparent from the following detailed description, which proceeds with reference to the accompanying drawings.

BRIEF DESCRIPTION OF THE DRAWINGS

FIGS. 6A-6D show player data generated from in-house and on-line activity by a player at the casino of FIG. 1A, according to an embodiment of the invention.

FIG. 8 shows the player utilizing the player's combined activity generated by the casino of FIG. 1A, according to an embodiment of the invention.

DETAILED DESCRIPTION OF THE PREFERRED EMBODIMENT

Figure 1A:
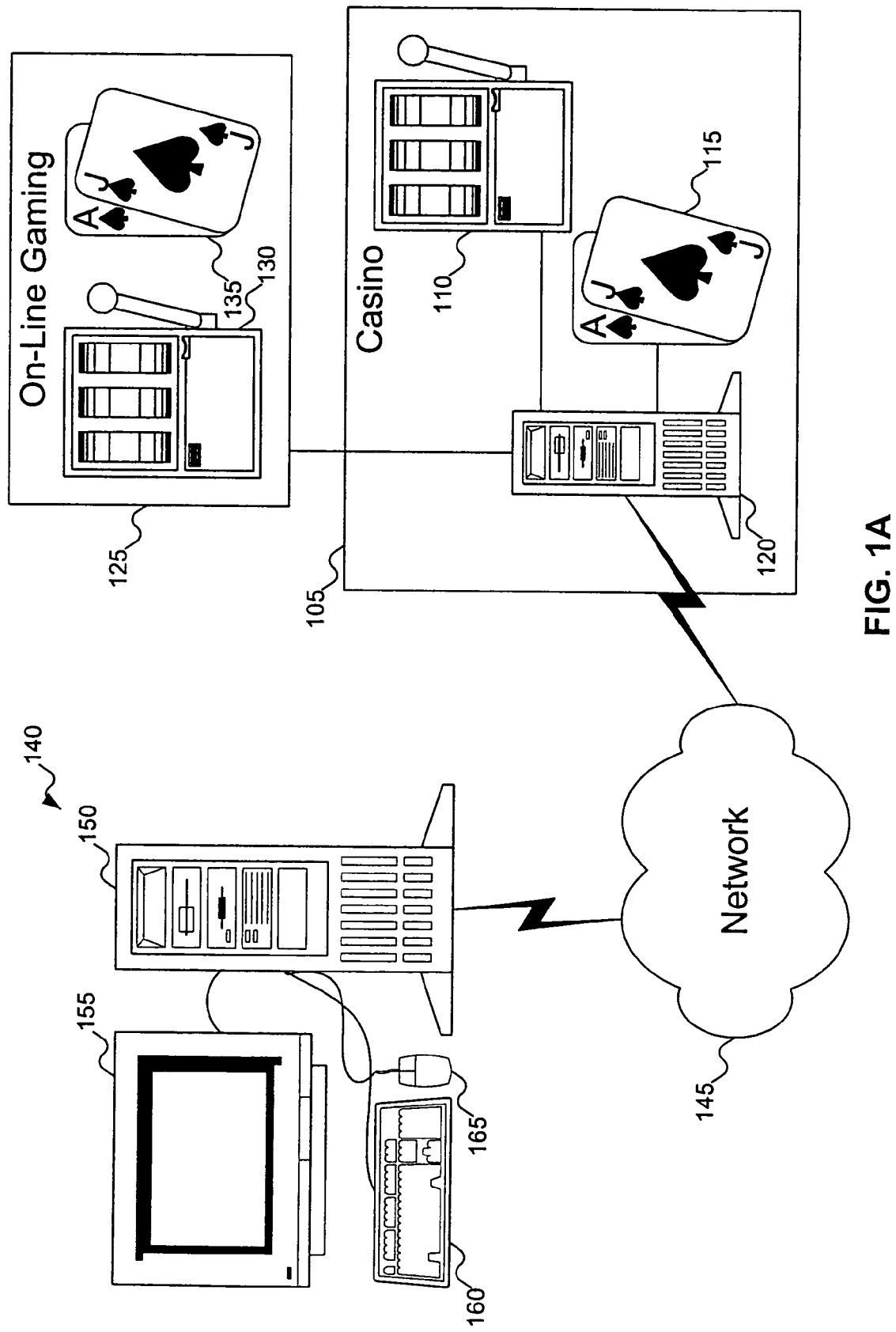
FIG. 1A shows a casino offering both in-house and on-line (over a network) gaming, according to an embodiment of the invention.

FIG. 1A shows a casino offering both in-house and on-line (over a network) gaming, according to an embodiment of the invention. In FIG. 1A, casino 105 includes various gaming devices, such as slot machine 110 and blackjack 115. (A person skilled in the art will recognize other games casino 105 might offer.) Casino 105 also includes server 120, which tracks a player's activity within the casino. Thus, as the player uses slot machine 110 or blackjack table 115, the player's coin-in, winnings, etc. is all tracked via server 120. The tracked data can be stored locally on server 120, or it can be stored in a secure server offsite (see FIG. 2 below). In addition, server 120, although shown as physically within the confines of casino 105, can be located outside casino 105.

Casino 105 also offers an on-line gaming web site 125. Web site 125 offers Internet gaming similar to that offered in-house at casino 105, but without using the physical devices available in-house. For example, web site 125 might offer on-line versions of slot machine game 130 or blackjack game 135. The credits used by the player in Internet gaming can come from any desired source. For example, the player can input a credit card number to web site 125, which then issues the player a number of credits in exchange for a charge to the player's credit card. Or the player can use credits associated with the player's account. Systems for transferring credits from a player's account to a gaming device are described in U.S. patent application Ser. No. 09/134,285, filed Aug. 14, 1998, now issued, and U.S. patent application Ser. No. 09/694,065, filed Nov. 19, 2000, now pending, which are hereby incorporated by reference. A person skilled in the art will recognize how the systems can be modified to transfer credits to a web site offering Internet gaming.

To use web site 125, a user connects to web site 125 from a computer, such as computer system 140, across network 145. Computer system 140 conventionally includes computer 150, monitor 155, keyboard 160, and mouse 165. A person skilled in the art will recognize that although computer system 140 is shown as a desktop personal computer, the invention is not limited to any specific type of computer. For example, computer system 140 can also be an Internet appliance, with monitor 155, keyboard 160, and mouse 165 integrated into the housing of computer 150. Computer system 140 can also take other forms: for example, a personal digital assistant (PDA) or other handheld device, or even a cellular telephone. Optional equipment not shown as part of computer system 140 in FIG. 1A are other input/output devices, such as a printer. Also not shown in FIG. 1A are the conventional internal components of computer system 140: e.g., a central processing unit, memory, file system, etc. Similarly, network 145 can be any variety of network, such as a local area network (LAN), wide area network (WAN), wireless network, or global network (such as the Internet), among others. Network 145 can also be any combination of the above networks used to connect computer system 140 and web site 125.

Figure 1B:
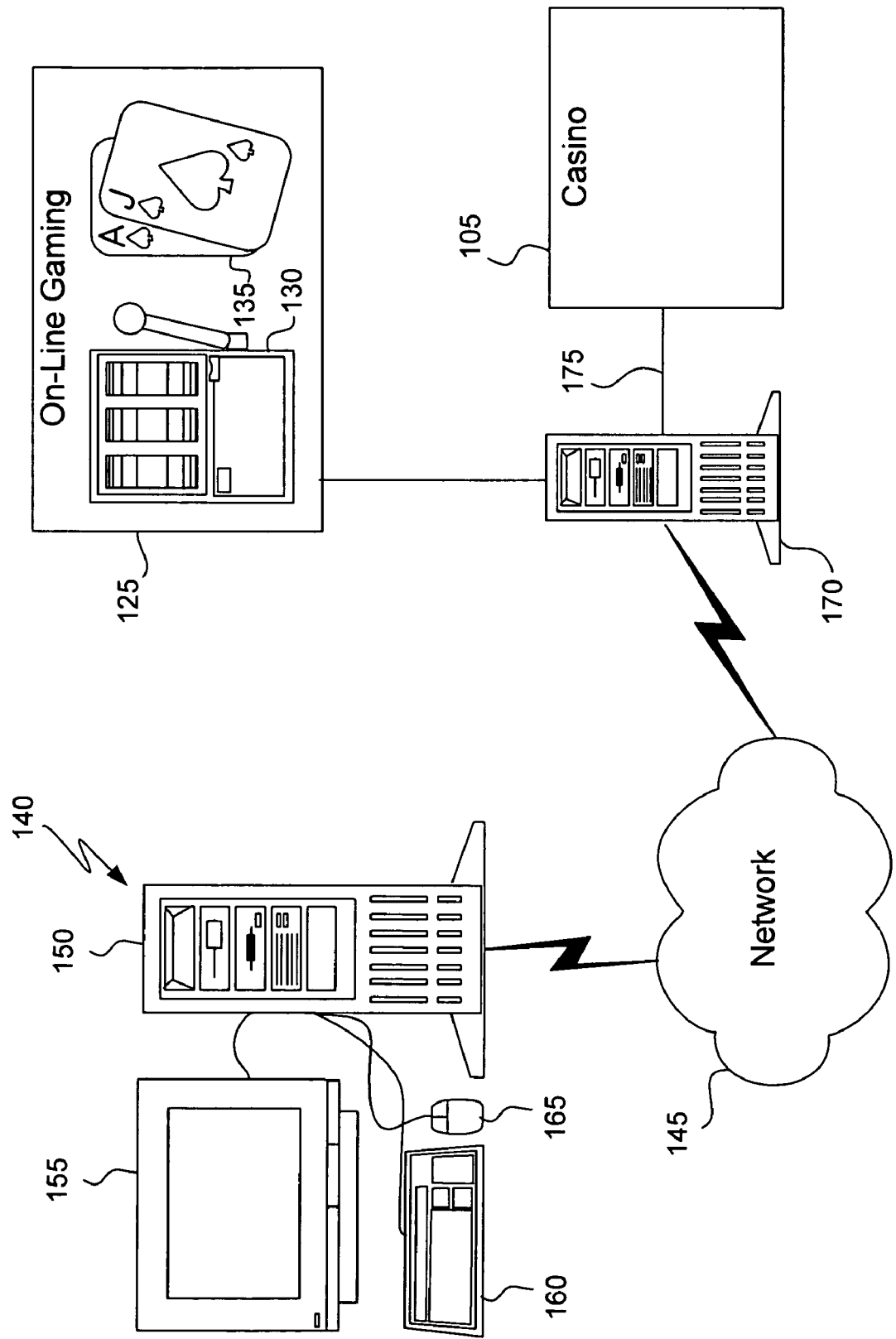
FIG. 1B shows the on-line gaming of FIG. 1A on a web site hosted by a server separate from the casino, according to an embodiment of the invention.

Although FIG. 1A shows web site 125 as being stored on server 120 within casino 105, a person skilled in the art will recognize that web site 125 can be stored on other servers. Similarly, web site 125 can be accessible through server 120 or can be totally separate, so that connecting to web site 125 does not require a path through server 120. For example, FIG. 1B shows an alternative embodiment. In FIG. 1B, web site 125 is hosted by server 170, which is separate from casino 105. Server 170 can be owned by casino 105, but physically separate from server 120. In this embodiment, where server 170 and server 120 are separate devices, typically server 170 does not store any player tracking information, which is preferably stored on server 120. Server 170 can also be located in a different environment, outside casino 105. Or server 170 can be a third party server, operated by a third party instead of casino 105 (but perhaps with direction from casino 105). A person skilled in the art will recognize other possible variations.

Even if casino 105 does not own or operate server 170, casino 105 will want to be able to track the player's activity on web site 125. To enable this tracking, server 170 can report the player's activities to casino 105. Connection 175 enables sever 170 to report a player's activities to casino 105. A person skilled in the art will recognize that connection 175 does not have to be a direct physical connection. Instead, server 170 can connect to casino 105 via network 145.

Although FIGS. 1A and 1B show web site 125 as providing the on-line equivalent of gaming in-house at the casino, web site 125 can provide other forms of entertainment to players. For example, rather than playing for money, web site 125 can offer players a play-for-fun site. In this configuration, when players use web site 125, they are not risking their own money. Nevertheless, casino 105 might want to track the player's activities, to reward the player for loyalty. For example, the player might earn points that are redeemable at the casino. Thus, even though the casino does not directly profit from the player's activities, there is an indirect profit motive, as the player will eventually visit the casino to redeem the points accrued, and hopefully spend money gambling at the casino. In addition, if the casino offers multiple web sites to players, some of the web sites can be configured for on-line gaming, and others can be configured for play-for-fun.

Figure 2:
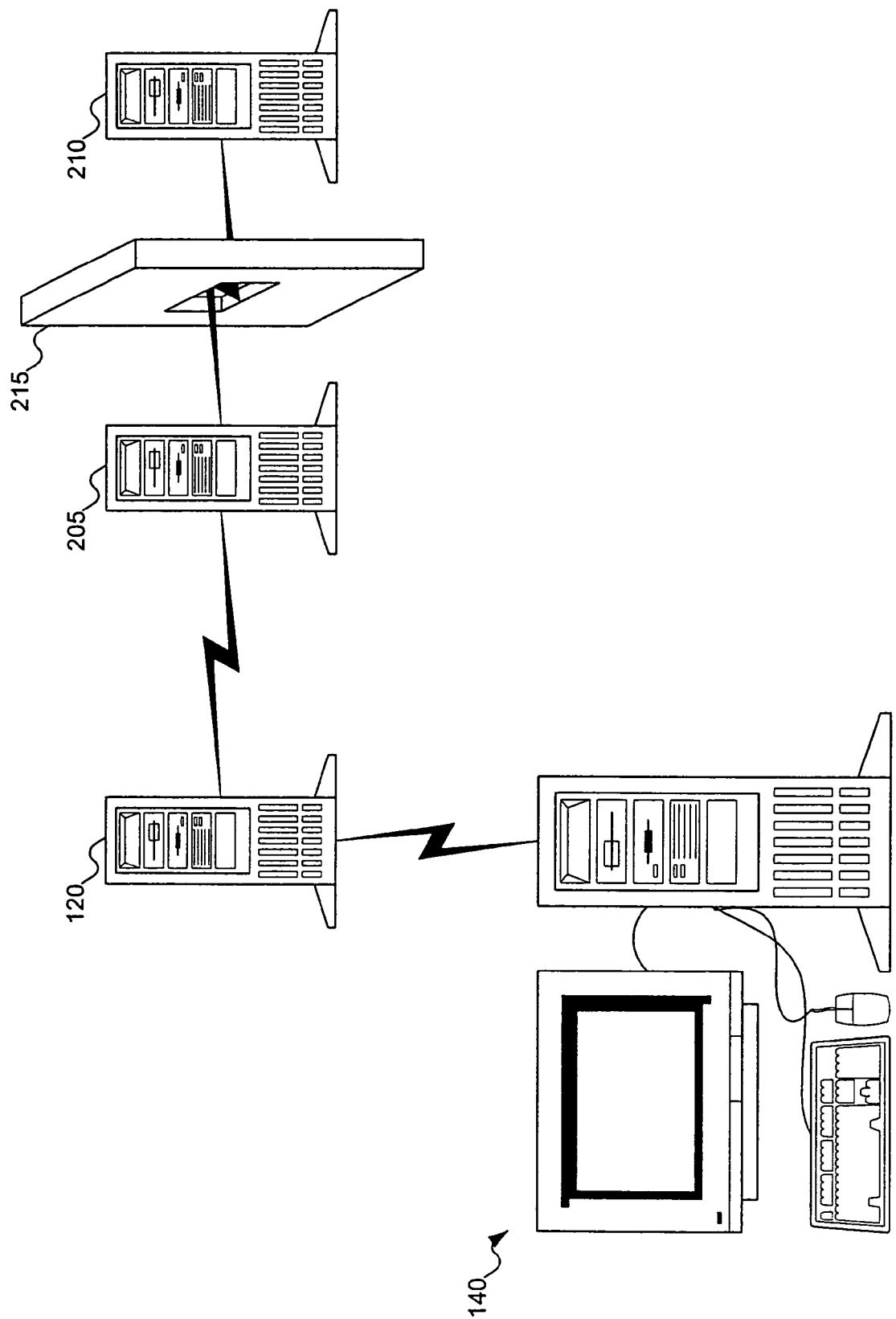
FIG. 2 shows a player communicating through the server of the casino of FIG. 1A, according to an embodiment of the invention.

Returning to FIG. 1A, as the player plays in-house at casino 105, playing for example slot machine 110 or blackjack table 115, information about the player's activity is tracked. Similarly, as the player plays on-line at web site 125, playing for example slot machine game 130 or blackjack game 135, information about the player's activity is tracked. In a preferred embodiment, the combined data is stored offsite in a secure server (as shown in FIG. 2 below). In a second embodiment the combined data is stored in server 120. Regardless of where the data is stored, the combined data gives the casino more information about the player that it might otherwise have had.

Although FIGS. 1A and 1B only show a single casino, a person skilled in the art will recognize that the invention can be generalized to multiple casino properties. For example, a single web site can track on-line gaming activity for players registered with more than one casino property. In addition, a single casino can have more than one web site (hosted on one or more servers, all of which can be distinct from server 120), with player tracking data being reported to server 120. A person skilled in the art will recognize other possible variations.

FIG. 2 shows a player communicating through the server of the casino of FIG. 1A, according to an embodiment of the invention. In FIG. 2, computer system 140 is shown communicating with server 120. Server 120, in turn communicates with ASP server 205, which in turn communicates with secure server 210 behind firewall 215. Secure server 210 can be used to store sensitive data: for example, player tracking data about a player's activities and his personal information, among other possibilities. More information about how such a system can be implemented is described in U.S. patent application Ser. No. 08/843,411, filed Apr. 15, 1997, now U.S. Pat. No. 6,319,125, issued Nov. 20, 2001, and U.S. patent application Ser. No. 08/322,172, filed Oct. 12, 1994, now U.S. Pat. No. 5,655,961, issued Aug. 12, 1997, which are hereby incorporated by reference.

ASP server 205 is responsible for managing secure communications between server 120 and secure server 210. In a preferred embodiment, server 120 sends eXtensible Markup Language (XML) requests to ASP server 205, which is the only device permitted to access secure server 210 behind firewall 215. But a person skilled in the art will recognize that server 120 can communicate with ASP server 205 other than by using XML. By having secure server 210 communicate with ASP server 205 rather than secure server 210, sensitive data can be kept secure on secure server 210 but still accessible from outside firewall 210 if the request is transmitted in the correct manner. ASP server 205 can then communicate with secure server 210 to obtain the response to the requests, which can be securely transmitted back to server 120, preferably using XML. Server 120 can then transform the XML response into HyperText Markup Language (HTML) using an eXtensible Stylesheet Language (XSL) Transformation (XSLT). The resulting HTML can then be displayed to the player on computer system 140.

Communication between server 120 and ASP server 205 is preferably encrypted. Any encryption scheme can be used: the Secure Sockets Layer (SSL) encryption protocol used on the Internet is a standard that can be applied to encrypt the communication. Similarly, communication between ASP server 205 and secure server 210 is preferably encrypted.

As an example of how the communications scheme of FIG. 2 can be used, consider the situation in which the player wants to update his personal information. (In this example, encrypted communications are not described, but a person skilled in the art will recognize how to introduce encrypted communications into the example.) Since personal information is sensitive (the player would not want it publicly available), the data would be stored on secure server 210, behind firewall 215. So, using server 120 the player can request to view his player data. (It is assumed at this point that the player has identified himself to the system.) The browser request made of server 120 is translated into an XML request of ASP server 205, which is forwarded to secure server 210. Secure server 210 responds with the personal information, which is formed into XML and forwarded to server 120. Server 120 uses XSLT to transform the XML data into an HTML page, which can then be presented to the user. Using a form, the player can update his personal data. XML form data can then be posted to ASP server 205, which can update the database on secure server 210. ASP server 205 sends an XML confirmation message back to server 120, which again uses XSLT to transform the XML confirmation message into HTML, which can be presented to the user.

Figure 3:
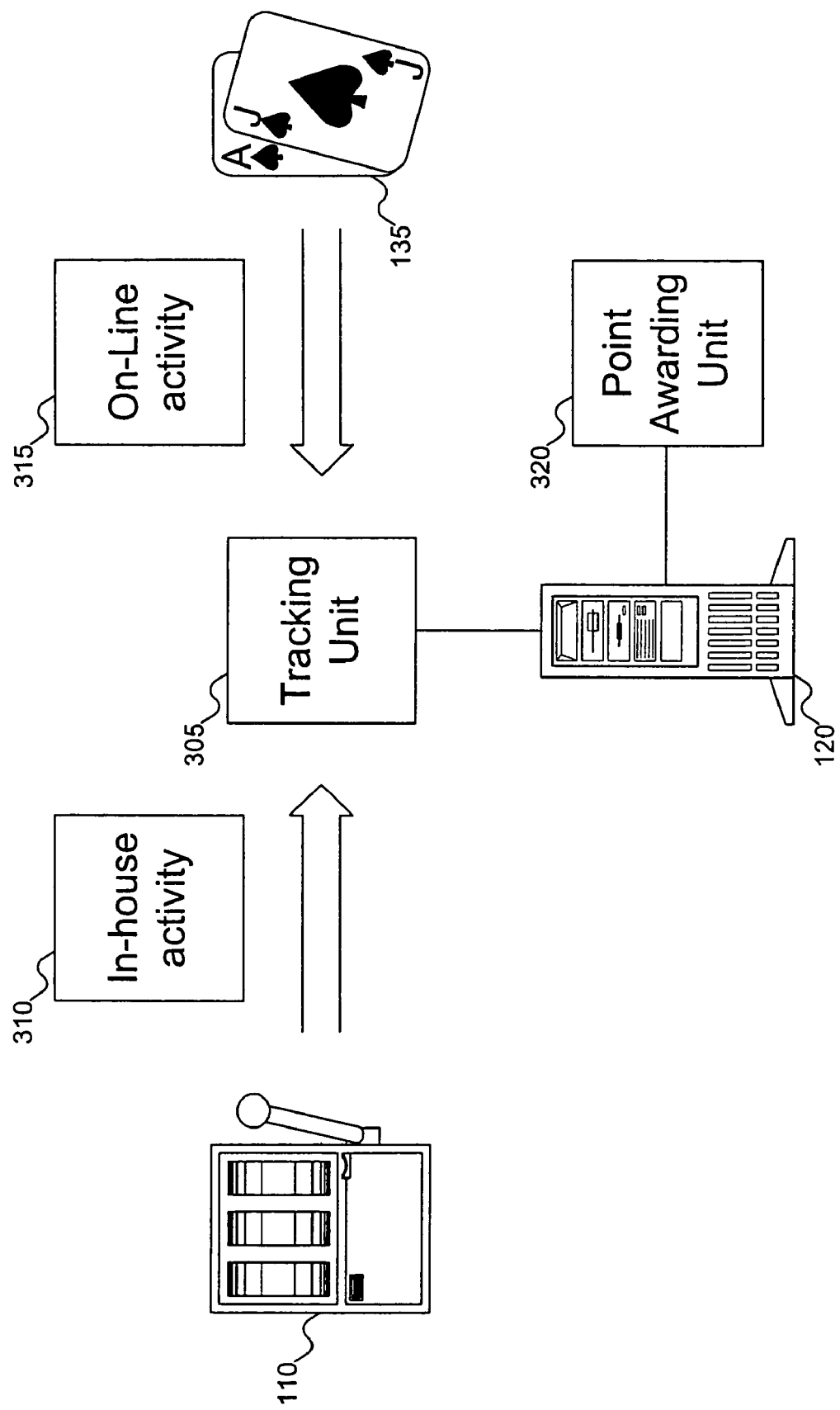
FIG. 3 shows the casino of FIG. 1A combining the in-house and on-line activity by the player, according to an embodiment of the invention.

FIG. 3 shows the casino of FIG. 1A combining the in-house and on-line activity by the player, according to an embodiment of the invention. In FIG. 3, activity by the player is tracked by tracking unit 305, part of server 120. For example, in-house activity 310, such as use of slot machine 110 by the player, is received by tracking unit 305, as is on-line activity 315, such as use of blackjack game 135. The activities are combined, enabling the casino to track all of the player's activities in a single account.

Server 120 also includes point awarding unit 320. Point awarding unit 320 is responsible for awarding points to the player, based on activity in the player's account. For example, if the player has gambled enough (say, $1000), point awarding unit 320 can award the player points. These points, in turn, can be used to give benefits to the player: for example, with enough points, the player can be awarded a complimentary visit to the casino buffet.

Although FIG. 3 shows point awarding unit 320 as included in server 120, other implementations are possible. For example, points can be awarded by gaming devices as the player plays, and by the gaming web site as the player plays on-line. In that case, server 120 simply merges points awarded by individual gaming devices, rather than awarding points based on play. A person skilled in the art will recognize other possible configurations.

In FIG. 3, in-house activity 310 and on-line activity 315 are uploaded to server 120 in real-time. That is, as the activities occur, the information about the activities is communicated to server 120. This communication allows server 120 to accumulate information about a player's activities as quickly as possible, so that the player information stored on server 120 can stay current.

Figure 4:
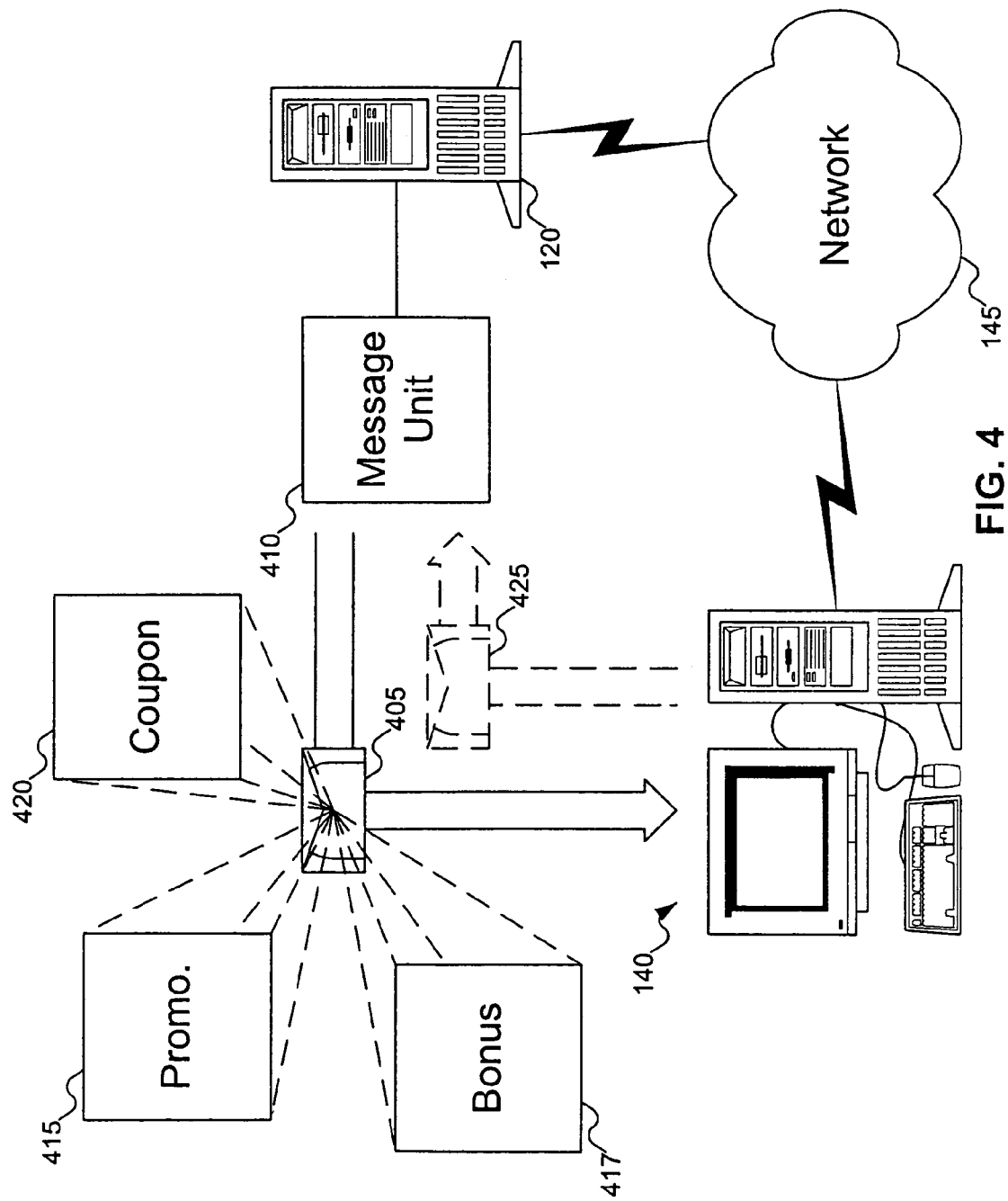
FIG. 4 shows the casino of FIG. 1A delivering a benefit to the player, according to an embodiment of the invention.

FIG. 4 shows the casino of FIG. 1A delivering a benefit to the player, according to an embodiment of the invention. In FIG. 4, server 120 of the casino is shown sending electronic message 405 to computer system 140. Message 405 originates within message unit 410, which generates the message. Message 405 can be anything: a special offer to club members, a menu for the buffet, or an announcement about an event. But more likely, message 405 is a special offer for the player, determined by his activities (both in-house and on-line). As such, message 405 can include promotion 415, bonus 417, coupon 420, both offering some sort of benefit to the player. According to the present invention, a bonus is a prize are awarded in addition to any jackpot and is based on a separate set of payout tables or criteria. Essentially, a bonus is any prize paid out above and beyond awards from a gaming device pay table. A bonus prize can be in the form of cash, credits or non-monetary awards, such as a car, or any combination thereof. The bonus prize can also be tiered into a main bonus prize and multiple secondary bonus prizes, plus optional consolation prizes, and similar combinations. A list of possible bonuses is shown in Table 1, and their marketing techniques and advantages are shown in Table 2.

TABLE 1

| Title | Objective | Description |
| --- | --- | --- |
| 2 for 1 offer | Increase headcounts. Stimulate new trial. | Customers receive free offer with purchase of a qualifying item. |
| Bounce Back Discount | Increase occupancy and average daily rate, especially in periods of slack demand. | Guests are given a bound back coupon with value added hotel offer, usually framed within period of slack demand. |
| Brand Product Co-Op Giveaways | Increase play. Heightened brand awareness. | Player is rewarded with brand product when meeting gaming criteria. In a variation, product is given when player shows up without any qualification. |
| Cash Letters | Stimulate a visit. Instigate play. Build customer loyalty. Pre-empt players from migrating to competitor's casino. | Tiered cash offers based on financial value of player group to casino. Letters are sent to the player and then redeemed in the casino. |
| Club | Develop and grow player database. Maximize value of marketing dollar using direct marketing techniques as opposed to media. Generate | Players earn points and other value added incentives by using tracking mechanism when playing slots. Similar to the frequent flyer model used by airlines. Typically, points are earned in conjunction with coin-in that can be redeemed for cash and/or comps. A rating |

TABLE 1-continued

| Title | Objective | Description |
|---|---|---|
| | brand loyalty. | methodology is typically implemented to tier player classes based on financial value to casino. |
| Comps | Build customer loyalty. Keep customers in the casino. Provide value added. Increased perceived value as compared with actual cost. | Complimentary food/beverage/hotel/amenities are earned through casino play. In some cases points are liquidated or redeemed for complimentary offer. In others, player accrues a "comp value" in addition to points earned that he may or may not be aware of. |
| Defected Customer Programs | Bring back players who have not been in the casino since a prescribed period of time. | Notification and incentive offer to club members who have not had rated system play for the previous X months. |
| Demand Driven Rate Offer | Increase occupancy and average daily rate. Maximize property revenue by filling rooms with highest-level players. | Qualified players are sent tiered offers that include complimentary room accommodations, either in advance of low demand or special citywide event. Rate or comp status can be determined by player's value to casino. |
| Drawings | Stimulate gaming. | As indicated below in "Life Changing Drawings," a segregated drawing can be mounted for players meeting specific criteria (e.g., all blackjack players). For example, earn a ticket with every blackjack dealt. Prize drawing is held at conclusion of a promotional period. The prize can be anything: e.g., a vehicle. |
| Free Ace | Stimulate blackjack play. | Coupon can serve as player's Ace when presented to dealer before the hand is dealt. A rule can be used to require the player to make a maximum bet. |
| Free drink or food component with purchase | Increase headcounts. Stimulate new trial. | Customers receive free offer with purchase. |
| Free Football Parlay | Increase visits. Stimulate new trial. | Players register for weekly football contest to pick winners of each weekend's games. Weekly winners are awarded cash. |
| Gift of the Month | Increase play during specific time frame. Increase spending per visit. Build customer loyalty. Stimulate new trial. | Gifts given to players who accumulate the qualifying point amount during the month. Gifts can be tiered during same time frame to increase perception of value across broad spectrum of players. |
| Gift with Game Outcome or X Points Earned | Increase coin-in. Build Player's Club awareness and generate new accounts. Increase playtime and spend per session. | Players meeting game outcome requirements receive a gift. The gift can be anything: from stuffed animals to vacations, from boxes of candy to liquor. |
| Gift with new product launch | Increase awareness and stimulate trial of new game or casino amenity. | Gift or value added is offered in conjunction with new game/product roll out on casino floor. Usually facilitated by live attendants. |
| Gift with Purchase | Increase spending. Increase play during slack demand. Build customer loyalty. Stimulate new trial. | Players receive a themed gift with purchase/coin-in. |
| Holiday Drawings | Keep regulars focused on property as an agenda item during the holiday period. Maintain/increase customer counts, increase coin-in. | Drawings are held periodically throughout the holiday period. Chances are earned with purchases. In one variation, chances can also be earned during the period preceding the holiday. |
| Hot Ball | Build customer loyalty. Stimulate new play. | A hot ball (one numbered ball) is a randomly chosen ball prior to each session. Players hitting B-I-N-G-O with the hot ball wins additional cash. |
| Life Changing Giveaways | Stimulate trial, improve customer counts and coin-in. | A large prize drawing is held after some time frame during which any purchase qualifies the player for a chance. The prize can include any gaming, resort or retail activity. Drawings can also be game-specific. For example, the player can earn chances with every blackjack dealt to win prize. |
| Loss Leader Pricing | Increase property headcounts. Stimulate trial. | Popular food offerings are made at break-even or loss price points. |
| Marathons | Increase coin-in. Give known players opportunity to earn recognition and added prizes for play. Particularly valuable during periods of slack demand. Add value to Player's club card. Increase room occupancy. | Participants are given X amount of time to accumulate as many credits (or points) as possible. Winners receive cash prizes. Typically, the operator will try to pay as many places as possible. Sometimes banquets/parties are packaged in conjunction with event. |
| Match Play | Stimulate play. | Player uses match play coupon, usually to double or increase value of actual wager. This bonus is often used with blackjack and craps table games. |
| Multiple Point Promotions | Increase coin-in during periods of slack demand. Generate improved perception of value for player's club. | Players earn X times the regular number of points during a prescribed time frame. |
| Music and Entertainment | Add excitement to casino floor and drive traffic. | Any entertainment event from a lounge act to a stage spectacular or "star in showroom" is utilized to |

TABLE 1-continued

| Title | Objective | Description |
|---|---|---|
| Events | | generate awareness, improve positioning and drive non-qualified pedestrian traffic. |
| Packages | Increase occupancy and average daily rate, especially in periods of slack demand. | Guests are sent offers that package hotel rooms with food offerings or other amenities. |
| Parties/Celebrity Event | Increase brand awareness. Stimulate new trial. Increase play during slow periods. Increase customer trips. | Usually, a minimum charge or wager allows access to the event. Food and beverage are available with purchase. Sometimes a co-op sponsor will provide free product samples or the like in conjunction with event. |
| Paycheck Cashing | Increase traffic. Get players in casino with cash to spend. Pre-empt player from cashing at competitors' casinos. | Player is rewarded with gift, free game of chance, match play, or other value added offer when paycheck is cashed at casino. |
| Points | Build player database. Generate customer loyalty and new club membership. Competitive advantage. | Points are earned through casino play as an incentive. |
| Purchase Upgrade | Increase play, especially during slow periods. | Customer receives one level higher than actual purchase price for free. |
| Senior Program | Cultivate and develop loyal, productive "senior" customers (age 55+). | Various value added discounts and special events targeted specifically at seniors. |
| Special Event | Add value, reward and recognize good players for continued support of casino. | Upper tiered players are invited to entertainment or sporting events, sometimes off the resort's property. Typically, a pre- or post-party will be scheduled on the property in an effort to get players to play. |
| Tournaments | Build customer loyalty. Create excitement and energy on gaming floor. Stimulate play from onlookers. Add value to Player's Club Card. Increase traffic during slow periods. Increase room occupancy. | Participants play, usually against each other and the clock, in a variety of "tournament" style rounds. Prizes are rewarded to the top winner(s) of each round and final round. Some tournaments require a buy-in, others are free based on player qualifying through previous play. Sometimes banquets/parties packaged in conjunction with event. |
| Visit and Win | Build value to Player's Club Card. Generate new player's club members. Impact loyalty and coin-in. | Off line system used to allow club members to swipe once each day to earn instant prizes. |

TABLE 2

| Title | Traditional Marketing Technique | Internet Marketing Technique | Internet Advantage |
|---|---|---|---|
| 2 for 1 offer | Media, internal signage, newsletter. | Advertised in Restaurant section of web site. E-mail coupons (e.g., food upgrades) could be given for value added. | Increased awareness. Coupons used to increase headcounts. |
| Bounce Back Discount | Coupon at check out, direct mail. | Advertised in appropriate section of web site. E-mail offers. Content pushed to web site visitors. | Increased awareness. Reduced marketing expense. |
| Brand Product Co-Op Giveaways | Media, Internal signage, point-of-sale display in conjunction with product retailer. | Promote via web site with co-op brand. Product web site could also be utilized for cross-promotion. E-mail coupons for casino and brand's products can be given for value added. | Cross-promotion via product's web site adds synergy-prospecting element. Value added coupon could increase visits. Improved perception of Player's Club. |
| Cash Letters | Direct mail. | Cash offers are e-mailed to players. Offers are given a security number to eliminate copies/forgeries. | Increased awareness. Postage and printing costs for qualified direct mail minimized. |
| Club | Media, internal signage, newsletter, direct mail, slot system display. | Advertised in the Player's Club section of web site. On-line registration. Incentives can be e-mailed to users for value added. | Increased registration. Identify "Internet" market segment. Lower marketing costs per sign-up. Grow market of potential Internet players if/when Internet gaming is legalized. Tiered customers can be communicated to using tiered e-mail offering. |
| Comps | Media, internal signage, newsletter, direct mail, slot system display. | Advertised in the Player's Club section of web site. Users can look up points and other information and redeem comps on-line. | Labor efficiency. Casino hosts will have more time pressing flesh with players instead of processing administrative paperwork. On-line comp |

TABLE 2-continued

| Title | Traditional Marketing Technique | Internet Marketing Technique | Internet Advantage |
|---|---|---|---|
| Defected Customer Programs | Direct mail is utilized with a "We miss you" and incentive based on player's previous value to casino. | E-mail could be used as on-going communication tool using a structured and tailored series of messages intended to entice the player back into the fold. | redemption/point totals will generate ongoing awareness. Greater potential message frequency and fractional marketing cost. |
| Demand Driven Rate offer | Direct mail. | Advertise in appropriate section of web site. E-mail offer and push on-going communication. | Increased awareness. Reduced marketing expense. |
| Drawings | Advertising, newsletter, direct mail, internal signage. | E-coupons could be used to stimulate additional visits. E-mail communication can remind contestant that he already has X chances to win. | Increased level of ongoing communication. Improve effectiveness of promotion. |
| Free Ace | Coupons distributed through various outlets and media. | E-coupons can be tiered and administered with frequency based on quality of player. | Broadens value of promotion. Increased appeal to known players and pedestrians. Lower distribution costs. |
| Free drink or food component with purchase | Internal signage, newsletter. | Advertised in Restaurant section of web site. E-mail coupons (e.g., food upgrades) could be given for value added. | Increased awareness. Coupons used to increase headcounts. |
| Free Football Parlay | Media, internal signage, newsletter. | Advertised in Events Calendar section of web site. E-mail coupons (e.g., beverage offer with purchase) could be given for value added. | Heightened awareness. Reduced media expense. |
| Gift of the Month | Media, internal signage, newsletter, direct mail. | Advertised in the Player's Club and Events Calendar sections of web site. Value added via coupon. | Heightened awareness. Improved results. Lower overall marketing costs. |
| Gift with Game Outcome or x Points Earned | Media, internal signage, newsletter. | Advertised in Events Calendar of web site. E-mail coupon could be given for value added. | Increased awareness. Postage and printing costs for qualified direct mail minimized. |
| Gift with new product launch | Internal signage, newsletter, direct mail invitation, media, publicity. | Play for Fun game could be posted on web site in conjunction with product rollout. Advertised in Events Calendar section of web site. E-mail coupon could be given for value added. | Player could "test drive" product on-line. Increased awareness. Postage and printing costs for qualified direct mail minimized. |
| Gift with Purchase | Media, internal signage, newsletter. | Advertised in Events Calendar section of web site. E-mail coupons could be used for value added. Play for Fun game outcome could dictate amount of value added. | Heightened awareness. Reduced media expense. |
| Holiday Drawings | Media, Internal signage, newsletter and private offers via direct mail with extra chances for qualified players. | Promotion advertised in current Events Calendar section of web site. Qualified players receive extra chances via e-mail. Extra chances could also be earned with on-line tournaments. | Postage and printing costs for qualified direct mail minimized. On-line tournament could improve attendance and return on investment. Improved value perception of Player's Club. |
| Hot Ball | Media, internal signage, newsletter. | Advertised in Events Calendar section of web site. E-mail coupons (e.g., bingo upgrade) could be used for value added. Play for Fun game outcome could dictate amount of value added. Internet-only coupon bonus hot ball award. | Increased awareness. Lower marketing costs. |
| Life Changing Giveaways | Media, internal signage, publicity, newsletter and private offers via direct mail with extra | Promotion advertised in current events. Qualified players receive extra chances via e-mail. | Postage and printing costs for qualified direct mail minimized. Improve value perception of Player's Club. |

TABLE 2-continued

| Title | Traditional Marketing Technique | Internet Marketing Technique | Internet Advantage |
|---|---|---|---|
| | | chances for qualified players. | |
| Loss Leader Pricing | Media, internal signage, newsletter. | Additional advertising opportunity. E-mail discount coupons can be awarded based on Play for Fun outcome. | |
| Marathons | Internal signage, newsletter, direct mail invitation, specialty media. | Advertised in Events Calendar of web site. Players could register on-line. E-mail reminder prior to marathon. On-line marathon style tournament could be used to pre-qualify and promote. E-mail coupon could also given for value added. | Labor savings of on-line registration. On-line marathon add value to the website. Permission marketing improves results. Lower costs of overall marketing effort. |
| Match Play | Coupons distributed through various outlets and media. | E-coupons can be tiered and administered based on quality of player. | Broadens value of promotion. Increased appeal to known players and pedestrians. Lower distribution costs. |
| Multiple Point Promotions | Media, internal signage, newsletter, direct mail. | Advertised in the Player's Club and Events Calendar sections of web site. Value added via coupon. | Heightened awareness. Improved results. Lower overall marketing costs. |
| Music and Entertainment Events | Media, internal signage, publicity, newsletter, | Entertainment events publicized in Events Calendar section of web site. Advertising presentation could include video/music clip etc. Value added electronic discounts could be offered via permission marketing to qualified players. Tickets can be awarded as prize for on-line Play for Fun tournaments. | More compelling on-line promotion. Postage and printing costs for direct mail minimized. Improve value perception of Player's Club. Potential savings in regular scheduled media. |
| Packages | Coupon at check out, direct mail, in-room materials. | Advertise in appropriate section of web site. E-mail offer and push on-going communication. | Increased awareness. Reduced marketing expense. |
| Parties/Celebrity Event | Media, internal signage, newsletter, direct marketing. | Advertise in Events Calendar section of web site. E-mail value added e-coupon. Coupons could be required for party. | Heightened awareness. Reduced media expense. |
| Paycheck Cashing | Media, internal signage, newsletter. | Player can be reminded via e-mail a day or two before paycheck is due. Player can register at Cage via Internet connection. E-mail coupon (gaming incentive) could also be given for Internet value added. | Minimize time at cage during first check cashing procedure. Improve traffic. |
| Points | Media, internal signage, newsletter, direct mail, slot system display. | Advertised in Player's Club section of web site. Player point totals available on-line. Points can be earned through web site interactivity. Comps can be generated on-line. | Convenience/labor savings through on-line redemption. Value added offers exclusively for Internet redemptions (airline model). Player access to accounts maintains higher level of awareness. |
| Purchase Upgrade | Media, internal signage, newsletter. | Advertise in Events Calendar section of web site. E-mail coupons could be required. Play for Fun game outcome could dictate amount of value added. | Increased awareness. Lower marketing costs. |
| Senior Program | Media, internal signage, newsletter, direct mail, buttons, special slot card. | Advertised in appropriate section of web site. E-mail reminders prior to events. Special "Seniors Only" Play for Fun tournaments with value added coupon payoffs. | Increased awareness. Ability to provide ongoing communication. Reduced marketing costs. |
| Special Event | Direct mail invitation. | E-mail program can be used to strengthen communication and "tease" the event with multiple messages rather than just one invitation. Reminder notice X days before event can be used to minimize no-show factor. | Increased awareness. Ability to provide ongoing communication. |
| Tournaments | Internal signage, | Advertised in Events Calendar section of web site. Players could | Convenience/labor savings of on-line registration. On-line |

TABLE 2-continued

| Title | Traditional Marketing Technique | Internet Marketing Technique | Internet Advantage |
| --- | --- | --- | --- |
| | newsletter, direct mail invitation, specialty media. | register on-line. E-mail reminder prior to tournament. E-mail coupon could also given for value added. On-line slot tournaments could be staged as pre-qualifier with discount on registration. | tournaments add value to the website. Permission marketing improves results. Lower costs of overall marketing effort. |
| Visit and Win | Media, internal signage, newsletter. | Promote via e-mail. Daily swipe could be facilitated via Internet. Customer would be required to visit casino for fulfillment. Value added could be awarded exclusively via internet. | Improve number of visits. |

Once received, the player can take advantage of the benefit. Note that the benefit is electronically linked to the player's account, meaning that the player does not need to bring in any physical evidence of the benefit: he can redeem the benefit simply by identifying himself to the appropriate attendant. This is explained further below with reference to FIG. 5.

In FIG. 4, message 405 can be generated automatically by message unit 410. But message 405 can also be generated responsive to an inquiry by the player. For example, the player might inquire of the system whether he is entitled to any benefits, at which point the system checks his account and responds with any benefits to which the player is entitled. This is represented by inquiry 425 (shown as a dashed line to indicate that inquiry 425 is not required).

Figure 5:
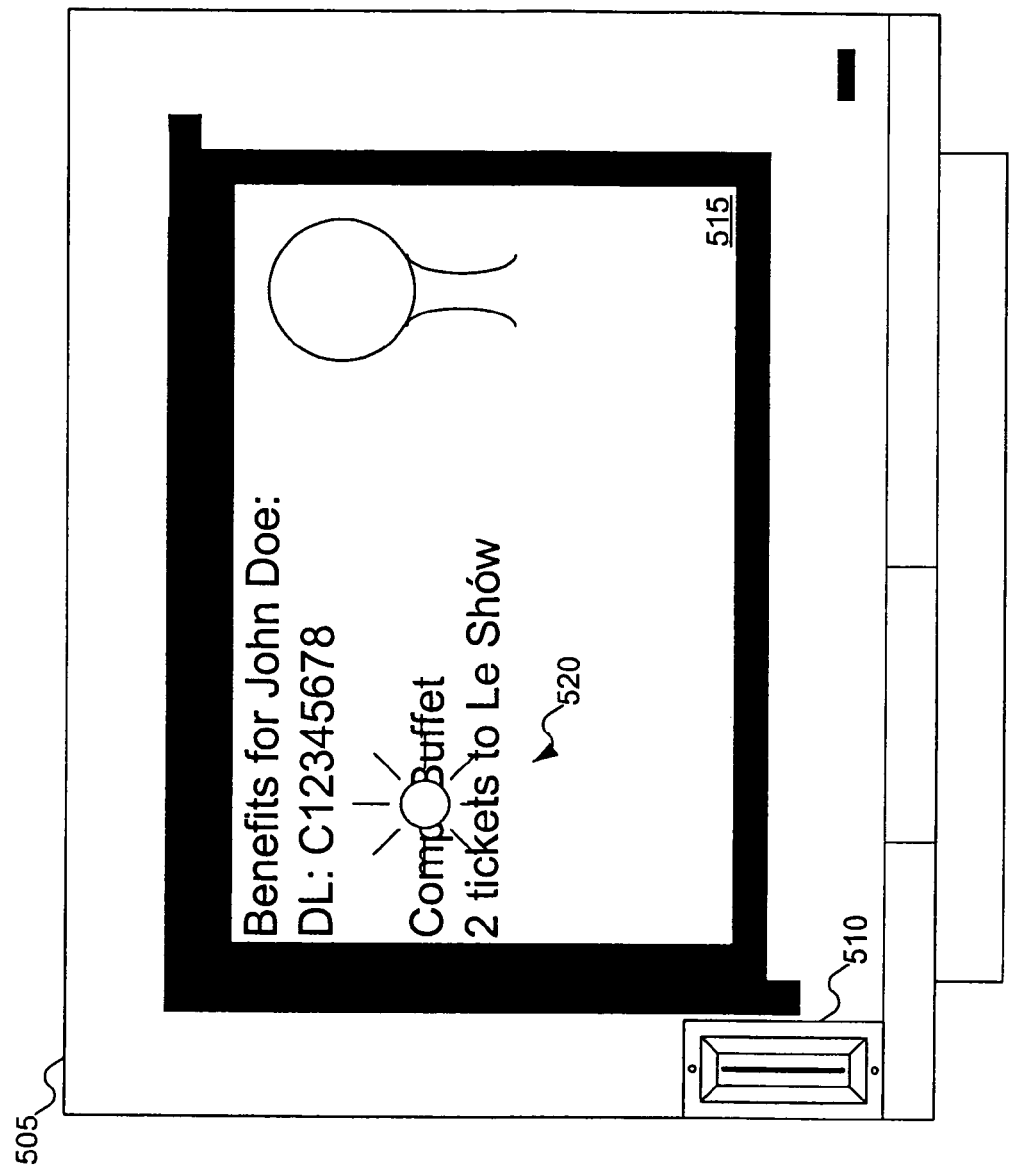
FIG. 5 shows a display used by the casino of FIG. 1A to verify electronically that a player is entitled to a benefit, according to an embodiment of the invention.

FIG. 5 shows a display used by the casino of FIG. 1A to verify electronically that a player is entitled to a benefit, according to an embodiment of the invention. In FIG. 5, monitor 505 is a display manned by a casino attendant. Monitor 505 is shown as a touch screen display, in which case no additional parts are required. But a person skilled in the art will recognize that monitor 505 can be any variety of display: for example, a cathode ray tube (CRT) or liquid crystal display (LCD) monitor, combined with some way to select a benefit, such as a mouse or keyboard. (The computer sending signals to the display can be a workstation connected to the server using some variety of network, or monitor 505 can be a dumb terminal, in which case the computer communicates with monitor 505 across some sort of cabling or network.) A person skilled in the art will also recognize that, if the system is sufficiently secure, the player can cash the benefit electronically, without the aid of an attendant.

The attendant uses monitor 505 to verify the player's identity. This can be done in any number of ways: for example, by placing the player's card in card reader 510, or by typing the player's driver license number into the system. A person skilled in the art will recognize other ways in which the player's identity can be verified. Once the system has some way to identify the player, information about the player's account is displayed, as shown in screen 515. For example, screen 515 shows a picture of the player's face, along with his driver's license number, which the attendant can use to verify the player's identity.

Screen 515 also shows the benefit to which the player is entitled. In FIG. 5, the player's account is linked to two benefits: a complimentary visit to the buffet, and two tickets to a show. The attendant has selected the complimentary buffet (shown by screen press 520). Presumably, the attendant is the cashier at the buffet, but the attendant could also be redeeming the benefit at a different station and giving the player a printout of the coupon, which could then be used at the buffet.

Of course, before a player can receive a benefit according to FIGS. 4 and 5, the player must be registered with the casino. The most traditional way for a player to register with the system is to have the player come in to the casino to register. A casino employee enters player data (either from a form prepared by the player or live as the player provides the data) into a computer and gives the player a player card. Then, when the player uses the player card at any gaming device, the system can track the player's activity. The player card can also have a number imprinted on it that is unique to that player card: the player can then use that number to identify himself for on-line gaming.

Instead of having players come to the casino in person to register an account, there are other ways in which players can be registered with the system. For example, the player can fill out an electronic form, over the Internet. The player can then be mailed the player card, and/or can be issued electronically an identification number that can be used for on-line gaming.

Other ways can also be used to register the player. For example, software exists that allow the Internet Protocol (IP) address of a computer to be located geographically. Using such software, a player can be located without having to type any information. When the player first sets up his account, the system can determine the player's location based on his IP address. But IP addresses identify computers, not persons: it is not possible to determine who is using the computer from the IP address. Further, if IP addresses are dynamically assigned, they do not even uniquely identify a computer.

Instead of assigning the player an identification number, an existing ID for the player can be used. For example, each state assigns persons in the state a unique driver's license number. The combination of the issuing state and the ID number can uniquely identify a player. The player can input this information to the system, and the system can forward the information to a third party database. The third party database can then return information about the player. The combination of issuing state and ID number can be used both to obtain information about a player for registration purposes (in setting up the player's account) and for identification purposes (for using the account).

In a preferred embodiment, a combination of methods is used to register a player. First, the IP address of the computer is checked to determine the player's location. Then the player is prompted for his ID number and issuing agency. The ID number and issuing agency are forwarded to the third party database, both to verify the player's location as determined by IP address and to obtain player demographic information. If the player's location is verified, the account is registered using the player's IP address, ID number, and issuing agency. But if the player's location is not verified, then the player is requested to telephone the casino or come in personally, and have a casino employee register the player's account.

Figure 6A:
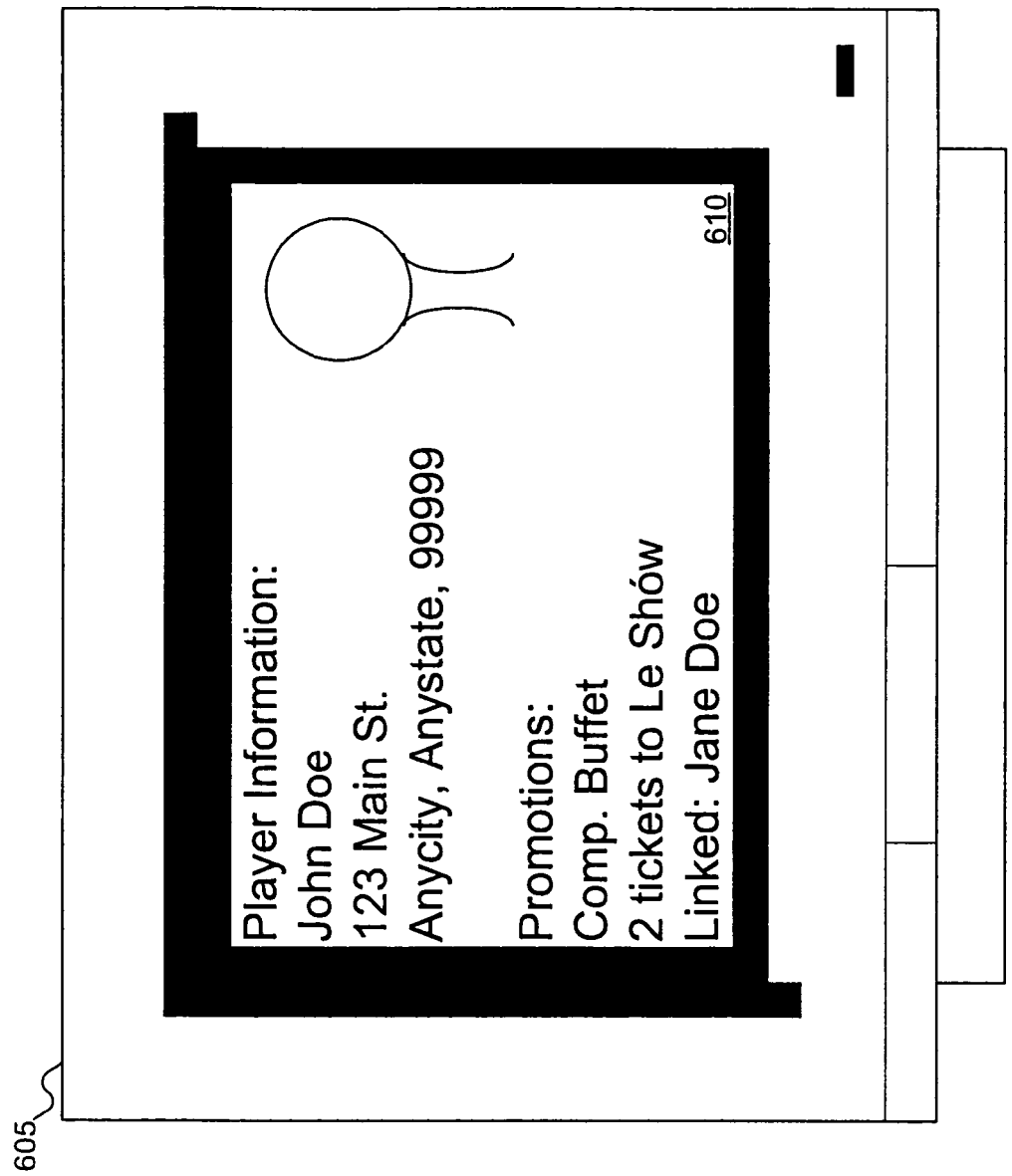

FIGS. 6A-6D show player data generated from in-house and on-line activity by a player at the casino of FIG. 1A, according to an embodiment of the invention. In FIG. 6A, basic player information is shown on monitor 605 in screen 610. Screen 610 is preferably generated using patron management software, which enables the casino to monitor a patron's (i.e., player's) demographics, gaming activities (both land-based and on-line), trips, promotions, bonuses, and comps, etc. For example, FIG. 6A shows a picture of the player, the player's name and address, any promotions being offered to the player, and any accounts linked to the player's account.

Forms can be used, with screens similar to screen 610, to input player information for new players. This allows the casinos to add new players to their databases. By linking players together (for example, husband and wife), the players can combine their activities, both for tax purposes and to increase the rate at which they earn points.

FIG. 6B shows statistically significant data for a player. For simplicity, FIG. 6B does not show monitor 605, but a person skilled in the art will recognize that screen 615 is typically displayed on monitor 605. In screen 615, each column stores information about various trips the player has made to the casino, and each row stores a particular type of data. For example, the column titled "Current Trip" stores data generated by the player during his current play at the casino. Similarly, the columns titled "Avg. Day," "MTD" (Month to Date), and "YTD" (Year to Date) store data about the player's average day, month to date and year to date, respectively, activity at the casino. Some of the data shown include the player's coin in to the slot machines, the player's coin out (that is, amount received back from the slot machines), any jackpots won, the casino's actual profits from the player (before factoring in any comps the player has received), the casino's theoretical profits from the player (after factoring in comps), and so on.

A person skilled in the art will recognize that the information presented in screen 615 of FIG. 6B represents only some of the data the casino might be interested in, and that the form of presentation shown in screen 615 is not the only form that can be used. For example, the partially obscured column at the right of screen 615 shows statistics about the player over his entire lifetime. In addition, the information shown on screen 615 can include statistics generated by all players linked to an individual account or just a subset of players, can include all properties owned by the casino or just a subset of properties, can be limited to specific revenue sources (for example, just slot machines or just table games), etc.

Figure 6C:
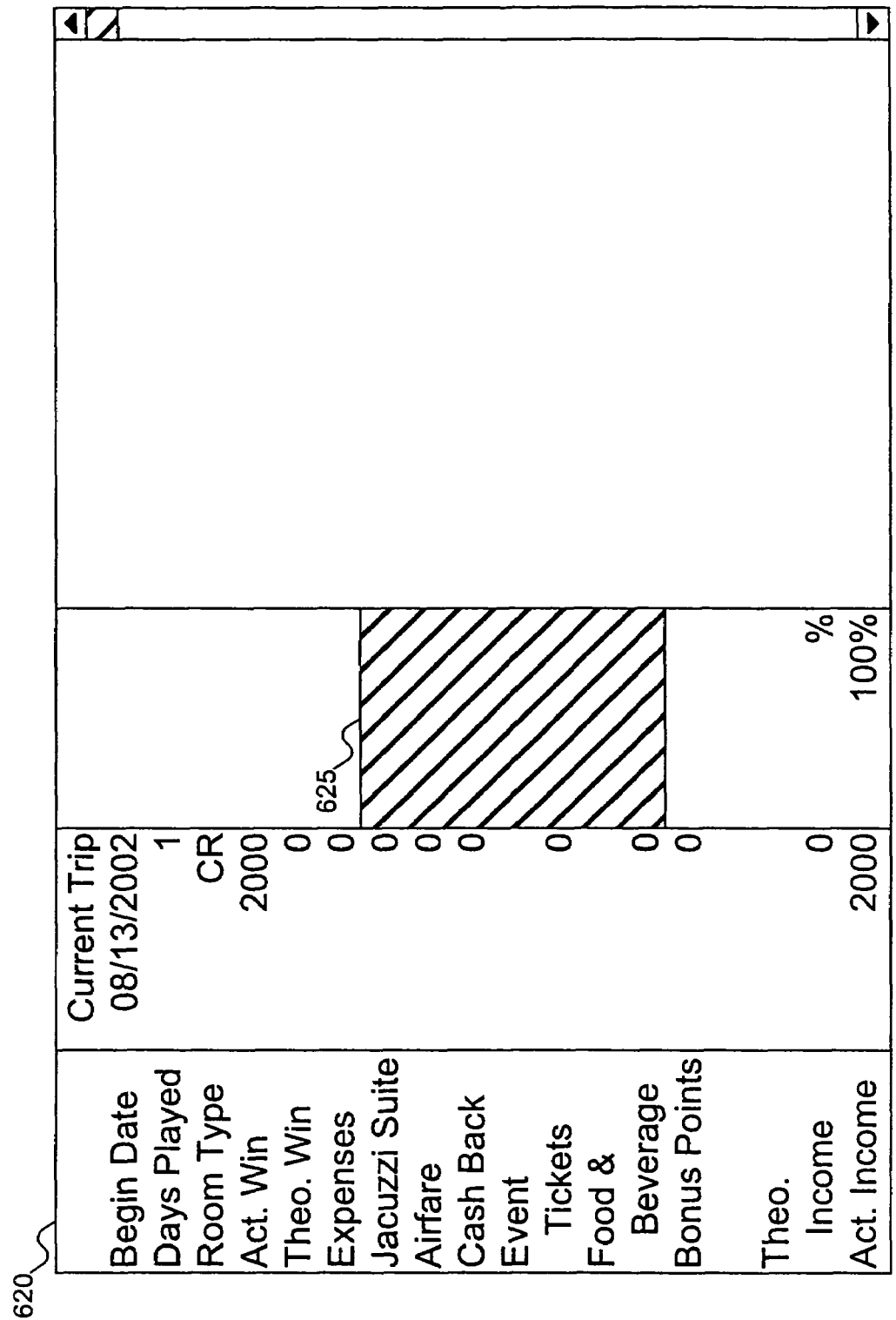

FIG. 6C shows a screen whereby the casino can calculate how close a player is to receiving a comp from the casino. As with FIG. 6B, monitor 605 is not shown in FIG. 6C. For example, in screen 620 the casino can see statistics from the player's current trip. To determine how close the player is to receiving a comp, the casino can enter the desired comp in shaded area 625. The system can then determine whether the player is entitled to the comp, and if not, how much additional activity the player will need before being entitled to the comp. By using screen 620, the casino can consider "what if" scenarios with the player.

As with screen 615 of FIG. 6B, screen 620 of FIG. 6C shows neither all the information that could be presented to the casino, nor all possible variations of presentation. For example, rather than considering the current trip, the casino can use screen 620 to consider what comps the player might be entitled to considering his activity during the current month or year, or over his entire lifetime, among others. Or the statistics of screen 620 can be limited to individual players, rather than linked accounts. The data can also be broken down to separate in-house gaming from on-line gaming. In addition, various combinations of the above presentation forms are possible. For example, the casino can use screen 620 to display the player's on-line gaming for the current year.

FIG. 6D shows a screen whereby the casino can view the player's current trips, along with any promotions available to the player. In section 635, screen 630 shows the trips the player has registered for. Some of the trips have been completed (with a status of "Complete"); others have not yet begun (with a status of "Pending"). The player is currently in town on trip number 3, and failed to show at all for one trip earlier in the August.

Although screen 630 shows the trips in reverse chronological order, a person skilled in the art will recognize that trip information can be presented to the casino in other formats. For example, screen 630 can show a portion of a calendar (such as the current week or the current month) and display the trips across the calendar.

Section 640 shows information about promotions offered by the casino. Various promotions are shown. Casino employees can add or modify the promotions, and can make certain promotions available to the player.

There are other uses possible for the information shown in FIGS. 6A-6D. For example, this information can be used to design new promotions, which might increase player activity. Or the information can be used to improve the gaming opportunities offered to the player, either in the casino or on-line. A person skilled in the art will recognize other possible uses for information about a player's account.

Figure 7:
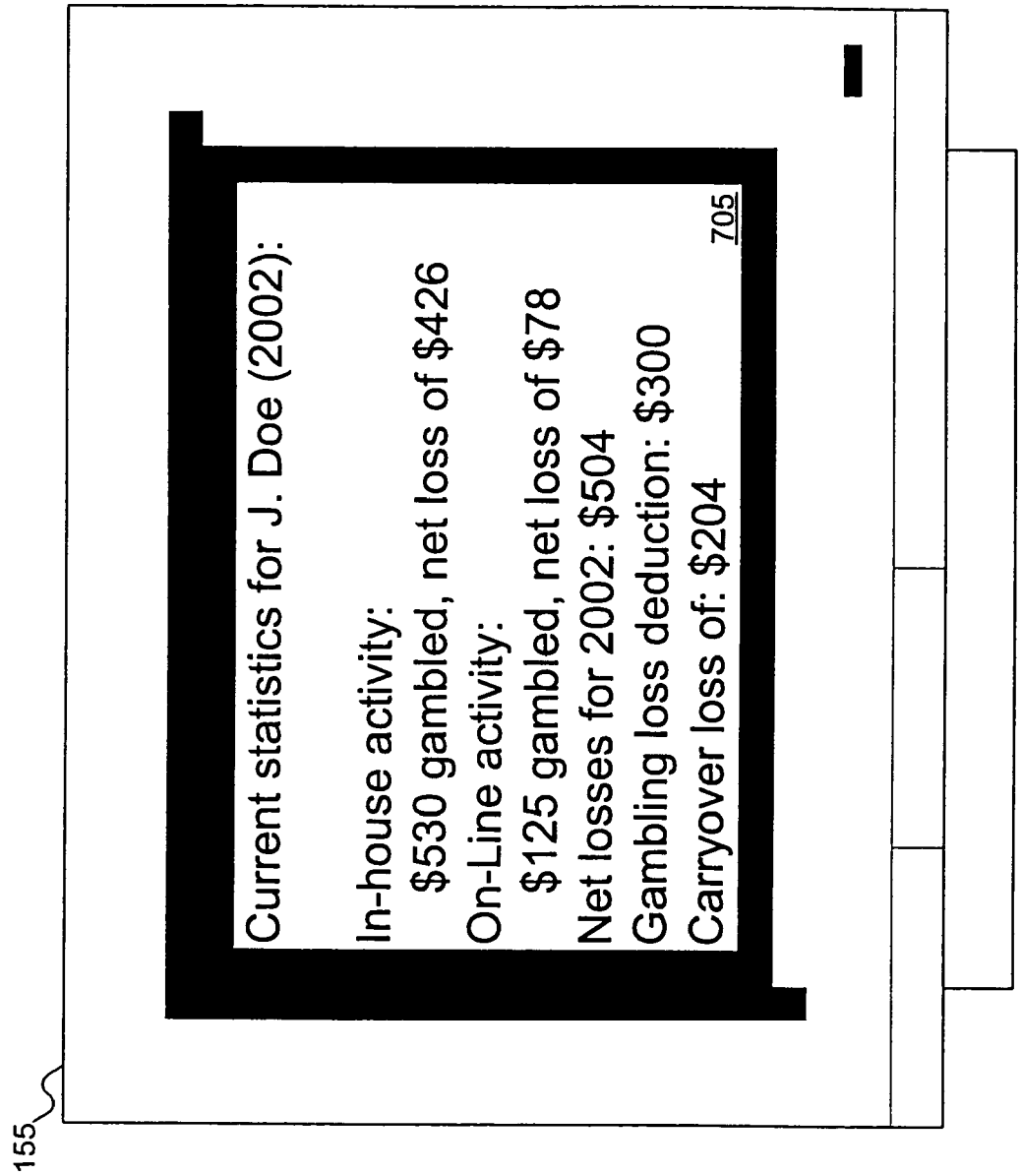
FIG. 7 shows a display of a player's combined activity generated by the casino of FIG. 1A, according to an embodiment of the invention.

FIG. 7 shows a display of a player's combined activity generated by the casino of FIG. 1A, according to an embodiment of the invention. Since the server stores both in-house and on-line activity in the account, the server can generate a tax statement for the player at any time, summarizing all of the player's activity. The player can connect to the server across the network and authenticate himself (for example, using his player's card number, driver's license, or any other desired form of identification). Screen 705, displayed on monitor 155 (part of computer system 140 of FIG. 1A), shows the player's current statistics, allowable deduction (based on the current tax regulations), and any carry-over deduction for next year.

FIG. 8 shows the player utilizing the player's combined activity generated by the casino of FIG. 1A, according to an embodiment of the invention. In FIG. 8, screen 805 is shown. Screen 805 can be displayed on monitor 155, as shown in FIG. 7. In section 810 of screen 805, the player can specify arrival and departure dates for the desired reservation, along with the number of guests. This includes searching for any promotions or comps the player might be entitled to. Then, when the player presses search button 815, the system searches to find all available rooms that might satisfy the reservation. These are shown in list 820. For example, the player might select row 825, which indicates that the player can receive a complimentary room (although more expensive room types are not offered as comps).

Figure 9A:
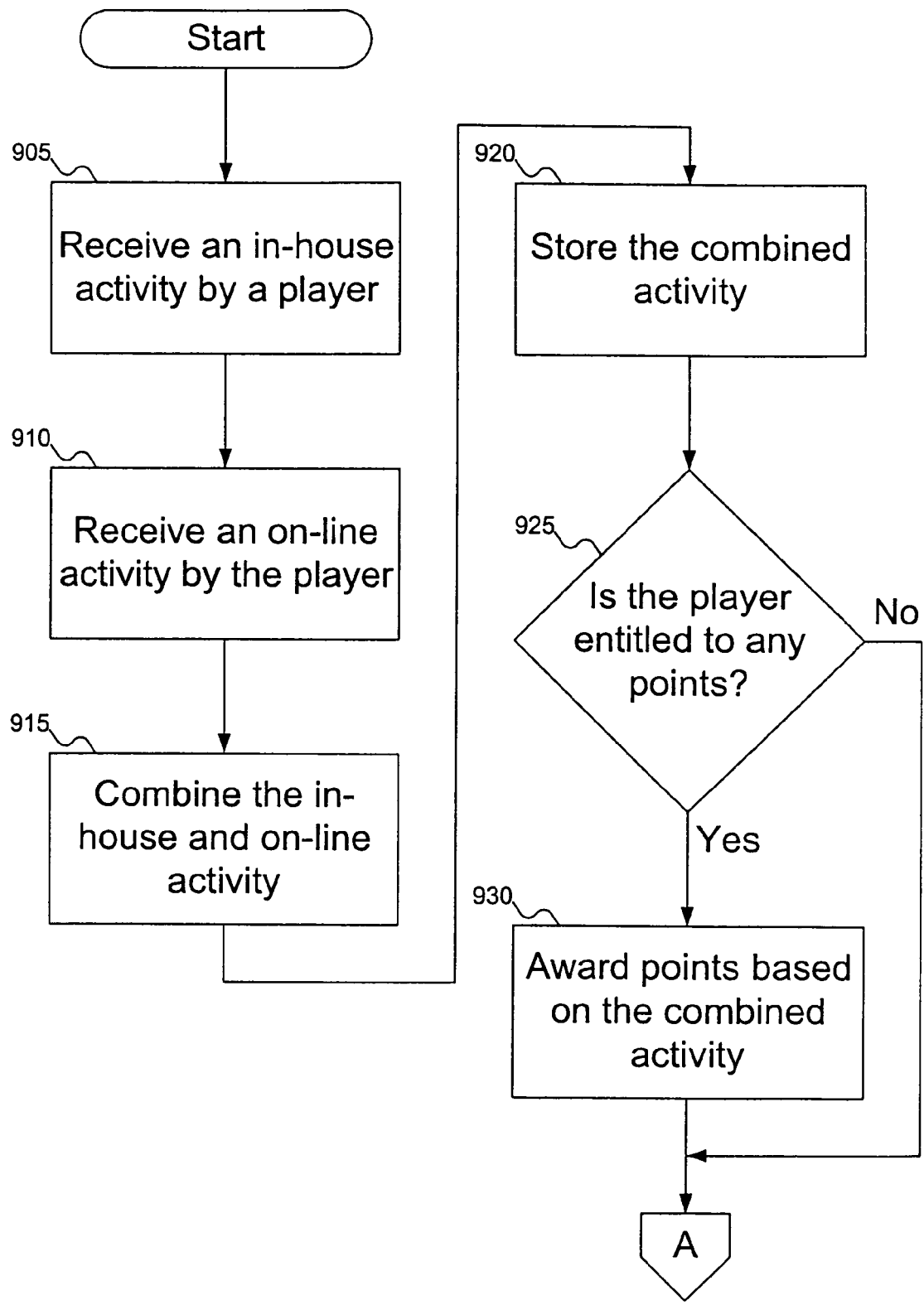
FIGS. 9A-9D show a flowchart of the procedure combining in-house and on-line activity of a player by the casino of FIG. 1A, according to an embodiment of the invention.
Figure 9B:
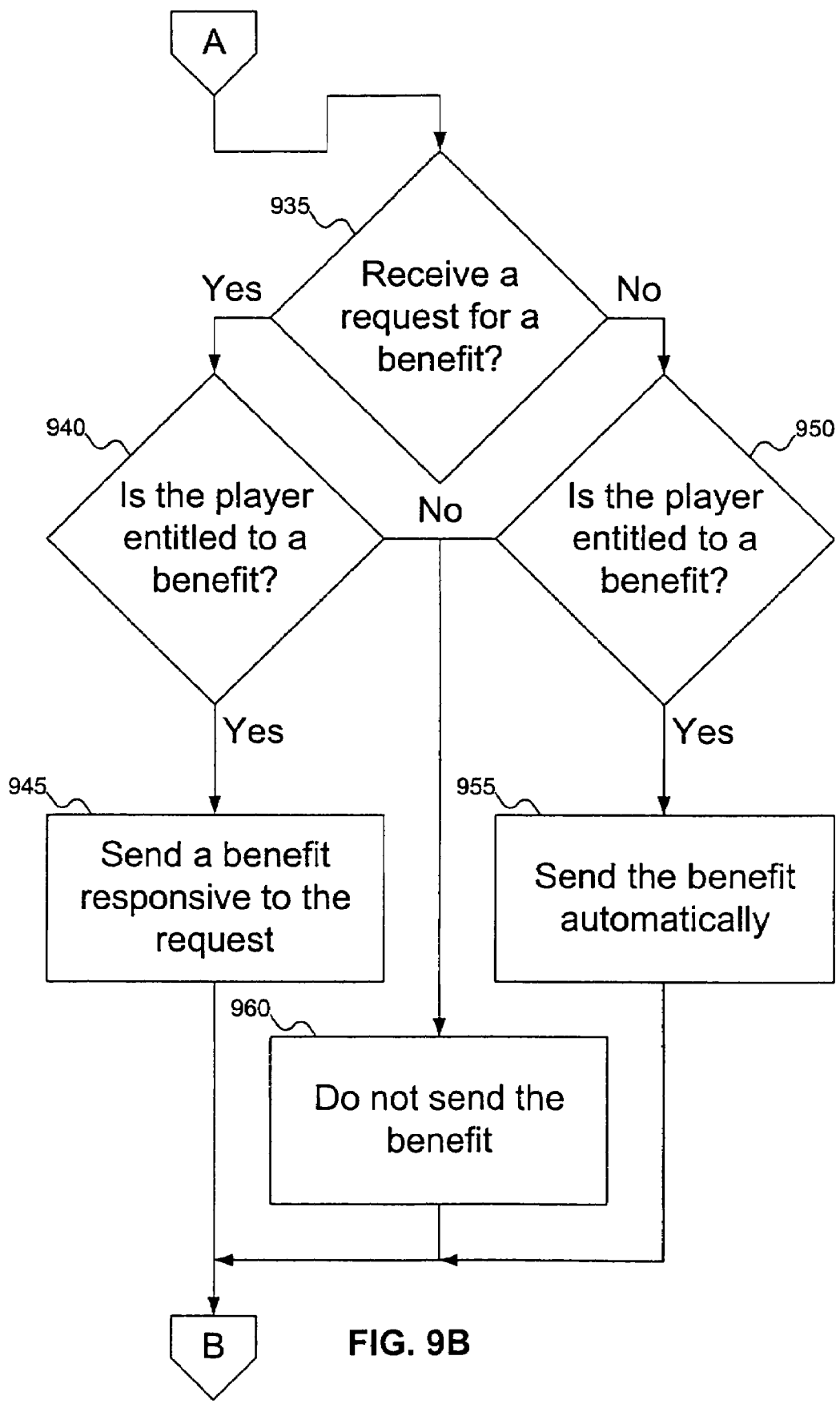
Figure 9C:
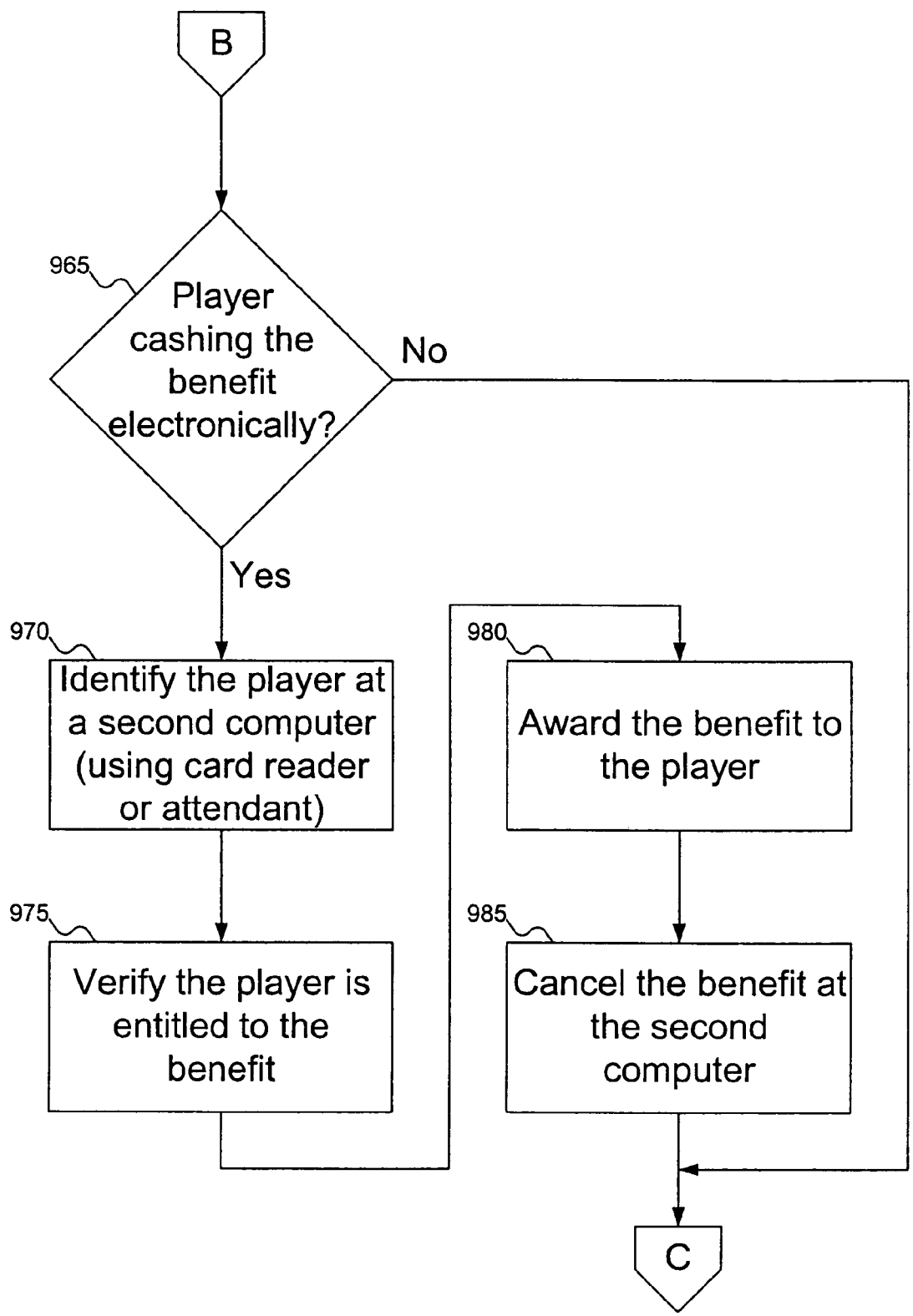
Figure 9D:
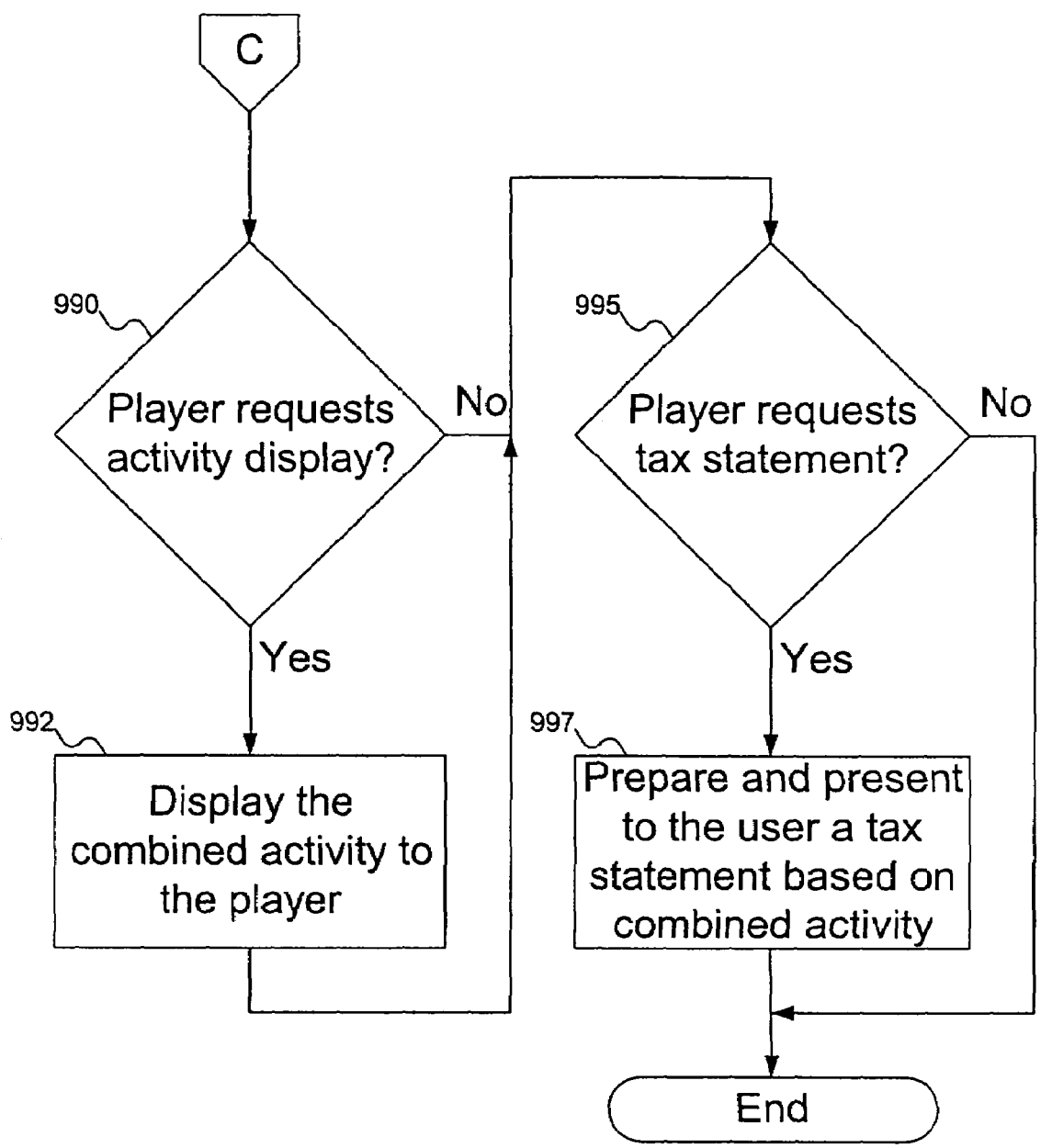

FIGS. 9A-9D show a flowchart of the procedure combining in-house and on-line activity of a player by the casino of FIG. 1A, according to an embodiment of the invention. In FIG. 9A, at step 905, the casino receives in-house activity by the player, and at step 910, the casino receives on-line activity the player. A person skilled in the art will recognize that steps 905 and 910 can be performed in either order, and can be repeated as needed. At step 915, the in-house and on-line activities are combined in the player's account, which is stored in step 920. At step 925, the system determines if the player is entitled to any points. If so, then at step 930, the player is awarded points based on the player's activity.

At step 935 (FIG. 9B), the system determines if the player has requested a benefit. If so, then at step 940 the system determines if the player is entitled to a benefit. If so, then at step 945 the system sends the player a benefit, responsive to the player's request. If the player did not request a benefit, the system can check on its own to see if the player is entitled to a benefit, as shown at step 950. If the player is entitled to a benefit, then at step 955 the system can send the benefit to the player automatically. Otherwise, if the player is not entitled to the benefit, then at step 960 the benefit is not sent.

At step 965 (FIG. 9C), the system determines if the player is trying to cash the benefit electronically. If so, then at step 970 the player is identified at a second computer (this can be done with or without an attendant). At step 975, the system verifies that the player is entitled to the benefit. At step 980, the benefit is awarded to the player, and at step 985 the benefit is canceled from the player's account.

At step 990 (FIG. 9D), the system checks to see if the player is requesting a display of the account activity. If so, then at step 992 the system displays the account activity to the player. At step 995, the system determines if the player is requesting a tax statement. If so, then at step 997 the system prepares and presents to the user a tax statement based on the player's activity.

A person skilled in the art will recognize that an embodiment of the invention described above can be implemented using a computer. In that case, the method is embodied as instructions that comprise a program. The program may be stored on computer-readable media, such as floppy disks, optical discs (such as compact discs), or fixed disks (such as hard drives). The program can then be executed on a computer to implement the method. The program, or portions of its execution, can be distributed over multiple computers in a network.

Having illustrated and described the principles of the invention in a preferred embodiment thereof, it should be readily apparent to those skilled in the art that the invention can be modified in arrangement and detail without departing from such principles. All modifications coming within the spirit and scope of the accompanying claims are claimed.

The invention claimed is:

1. A method for generating tax information about a player's gaming activity comprising:

receiving a wager from at least two players at one or more gaming devices;

tracking any gaming activity of the at least two players, which includes any wagers and awards of the at least two players, over a network, and combining and linking together the tracked gaming activity in a player tracking account;

storing the tracked gaming activity in the player tracking account at a server;

receiving, at the server from a computer, a player-initiated request from at least one of the two players for a tax statement;

determining whether the player is entitled to receive the tax statement;

thereafter, when the player is entitled to receive the tax statement, processing the tracked gaming activity to generate a tax statement summarizing the tracked gaming activity of the at least two players over multiple gaming sessions, the tax statement including an amount gambled, any amount lost and any carry-over deductions; and printing the tax statement at a printer, the tax statement being presented to the player.

2. The method of claim 1 wherein the tracked gaming activity is at a casino.

3. The method of claim 1 wherein the tracked gaming activity is conducted over an online connection and the computer is remote from casino gaming.

4. The method of claim 1 wherein a part of the tracked gaming activity is at a casino and another part of the tracked gaming activity is conducted over an online connection using the computer that is remote from the casino and wherein the tax statement summarizes the tracked gaming activity that occurs both at the casino and online.

5. The method of claim 4 wherein the casino includes gaming devices that are connected on the network at the casino and wherein the online connection is connectible to at least a portion of the network in response to a request from a player to make an online connection.

6. The method of claim 1 wherein the player's request is initiated at the computer that is remote from casino gaming.

7. The method of claim 6 wherein the computer is connectible via an online connection to at least a portion of the network in response to a request from a player to make an online connection.

8. The method of claim 1 wherein a part of the tracked gaming activity is at a casino and another part of the tracked gaming activity is conducted over an online connection using the computer that is remote from casino gaming.

9. The method of claim 8 wherein the casino includes gaming devices that are connected on the network at the casino and wherein the online connection is connectible to at least a portion of the network in response to a request from a player to make an online connection.

* * * * *